US006403158B1

(12) United States Patent
Corman

(10) Patent No.: US 6,403,158 B1
(45) Date of Patent: Jun. 11, 2002

(54) POROUS BODY INFILTRATING METHOD

(75) Inventor: Gregory Scot Corman, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/263,349

(22) Filed: Mar. 5, 1999

(51) Int. Cl.$^7$ .................................................. B05D 3/00
(52) U.S. Cl. ..................... 427/295; 427/294; 427/397.1; 427/427; 427/443.2; 264/101; 264/102; 264/279; 264/682
(58) Field of Search .................. 427/294, 295, 427/397.7, 443.2, 427; 264/102, 101, 279, 682

(56) References Cited

U.S. PATENT DOCUMENTS

| 4,120,731 A | 10/1978 | Hillig et al. |
| 4,141,948 A | 2/1979 | Laskow et al. |
| 4,148,894 A | 4/1979 | Hillig et al. |
| 4,238,433 A | 12/1980 | Hillig et al. |
| 4,240,835 A | 12/1980 | Laskow et al. |
| 4,294,788 A | 10/1981 | Laskow et al. |
| 4,296,417 A | 10/1981 | Markham et al. |
| 4,385,020 A | 5/1983 | Morelock |
| 4,535,035 A | * 8/1985 | Smialek et al. ............. 428/698 |
| 4,626,516 A | * 12/1986 | Morelock ..................... 501/92 |
| 4,737,328 A | 4/1988 | Morelock ..................... 264/101 |
| 4,889,686 A | 12/1989 | Singh et al. |
| 4,931,311 A | 6/1990 | Singh et al. |
| 5,019,430 A | 5/1991 | Higgins et al. |
| 5,294,489 A | 3/1994 | Luthra et al. |
| 5,628,938 A | 5/1997 | Sangeeta et al. |

* cited by examiner

Primary Examiner—Katherine A. Bareford
(74) Attorney, Agent, or Firm—Noreen C. Johnson; Christian G. Cabou

(57) ABSTRACT

A mixture is formed that comprises at least some to about 10 wt % boron nitride and silicon. A body comprising a component that is wetted by or reacts with silicon is contacted with the mixture and the contacted body is infiltrated with silicon from the mixture.

25 Claims, No Drawings

POROUS BODY INFILTRATING METHOD

This invention was made with government support under Contract No. DEFC 02-92-CE41000 awarded by Department of Energy. The government may have certain rights in the invention.

BACKGROUND OF THE INVENTION

The invention relates to a method for infiltrating a porous body of a material with silicon.

Lamellar and fibrillar materials are commonly introduced by melt infiltration to act as fillers and reinforcements in various composite materials. Silicon melt infiltration into a porous body containing silicon carbide (SiC) and/or carbon (C) is a common method for fabricating reaction bonded silicon carbide, or "siliconized" silicon carbide composite products. Examples of such composite products are silicon/silicon carbide (Si/SiC) ceramics and toughened ceramic matrix composites. An advantage of the silicon melt infiltration method is that it produces a product in near net shape, meaning that little or no change in preform dimension occurs during the infiltration/densification method. A near net shape method permits fabrication of products that require minimum machining.

An important aspect of the melt infiltration method is the process by which the silicon is brought into contact with the porous preform body. The silicon can be placed directly into contact with the preform. In another process, a carbon fiber wick is used to transport liquid silicon by capillary action from a resevoir to the material being infiltrated. These processes have several drawbacks. In the case of direct contact of preform and silicon, achieving complete infiltration of the body without leaving excess silicon on the body surface requires very precise metering of the amount of silicon. Bodies prepared by different techniques or with different ratios of starting materials require different levels of silicon for full infiltration. Each process change requires adjustment by trial and error of the amount of silicon. If a silicon-boron alloy is used for the infiltration, boron silicides (such as $B_3Si$, $B_4Si$ and $B_6Si$) are formed during melting. These boron silicides do not fully dissolve in the alloy during the infiltration process. Consequently an adherent residue of these borides (and other impurities) is left on the surface of the body that must be removed by machining. If a wick is used, a residue is left on the wick rather than on the infiltrated body. However, the wicks are strongly adherent to the infiltrated body and require machining for removal. Also, problems associated with adjusting the silicon level are made worse since now any variations in the size of the wick itself need to be taken into account. The use of wicks also limits the number of locations where the silicon can be introduced to the body. If the body is large or complex in shape, the silicon may be infiltrated in a non-uniform manner that results in composition and property variations.

Another problem with silicon melt infiltration is caused by the fact that silicon expands during freezing. As the silicon expands, excess silicon is pushed out to the body surface to form bumps of silicon metal. The bumps of silicon cause the body to fall out of tolerance, again requiring expensive machining after infiltration.

Thus, there is a need to provide a silicon melt filtration method that does not result in composition and property variations and that does not require expensive machining of the infiltrated composite product.

SUMMARY OF THE INVENTION

The invention is a method for infiltrating a body with silicon. A mixture is formed that comprises silicon and at least some to about 10 weight % hexagonal boron nitride. A body comprising a component that is wetted by or reacts with silicon is contacted with the powder mixture and the contacted body is infiltrated with silicon from the mixture. The phrase "at least some to about 10 weight %" includes as little as about 0.1 weight % hexagonal boron nitride, further includes about 1.0 weight % to about 10 weight % hexagonal boron nitride, and yet includes about 4 weight % to about 10 weight % hexagonal boron nitride.

In another aspect, the invention relates to a method for infiltrating a body with silicon, comprising coating a body comprising a component that is wetted by or reacts with silicon with a slurry of hexagonal boron nitride and silicon. The coated body is then infiltrated with silicon from the slurry.

DETAILED DESCRIPTION OF THE INVENTION

A porous body can be infiltrated with silicon by embedding the body in a mixture of silicon powder and a controlled amount of hexagonal boron nitride powder. Morelock U.S. Pat. No. 4,737,328 discloses a process for producing a composite by embedding a porous body comprising a substance which reacts with silicon in a powder mixture composed of silicon and hexagonal boron nitride powder. The Morelock patent teaches limits for the silicon-boron nitride (Si—BN) mixture of 10% to 90% of silicon by volume (equivalent to 90.6 wt % to 9.6 wt % boron nitride (BN). Presently, it has been found that compacted the silicon-boron nitride Si—BN mixtures containing 50% to 10% by weight of boron nitride (BN) do not result in infiltration of silicon (Si) into silicon carbide/carbon (SiC/C) bodies. The silicon infiltrates only when the boron nitride (BN) level is controlled at levels below about 10%.

Additionally, the Morelock patent specifies a method of contacting the porous preform that uses a dry compaction within a mold or die. According to the present invention, an aqueous slurry of the silicon-boron nitride (Si—BN) can be used to coat a preform to effect infiltration.

The present invention provides an improved method of performing silicon melt infiltration, which provides a clean body surface free of excess silicon metal. The silicon infiltrant in the form of a powder, is mixed with at least some to less than about 10 wt % boron nitride powder. The hexagonal boron nitride (BN) can be present in an amount less than about 9.6 wt %. In a preferred embodiment, the boron nitride powder is present in an amount from about 1 wt % to about 9.5 wt % and most preferred in an amount from about 5 wt % to about 9.0 wt % of the mixture. The silicon can include other alloying additives such as boron (B) but should be present in the powder mixture at least in an amount sufficient to produce the desired composite. Preferably the silicon (Si) is present in a range from about 99 wt % to about 80 wt % of the total mixture.

The mixture can be formed by a number of techniques. For example, the two powders can be simply mixed together. At least a significantly uniform mixture of the two powders is formed and preferably a uniform or substantially uniform mixture is formed. The mixture is then used as the source of silicon for melt infiltration. In another aspect of the invention, the mixture is mixed with water to form a slurry, which is dip coated or spray coated onto a preform body. The body is then subjected to an infiltration heat treatment wherein the silicon melts and infiltrates into the porous body. The vacuum pressure, furnace temperature, and time at temperature for infiltration are the same, or substantially the same, as used in the techniques of the Morelock patent, which is incorporated herein by reference in its entirety.

In all aspects of the invention, excess silicon in the infiltrant mix or silicon that is pushed out to the body surface during freezing, remains on the surface mixed with the boron nitride (BN) powder. After infiltration, any material remaining on the surface of the body is a friable boron nitride (BN) mixture that can be easily scraped away. Additionally, the spray and dip coating embodiments of coating the preform body facilitate introduction of silicon over an entire surface of the preform to provide a uniform and faster infiltration.

The silicon powder can range widely in size but preferably should not be greater than about 100 mesh, i.e. no greater than about 150 microns. Mesh herein means U.S. Sieve Size. Larger particles have a tendency to coalesce and not infiltrate the body. Preferably, the silicon powder has a particle size of about 200 mesh, i.e. no greater than about 75 microns. The hexagonal boron nitride (BN) powder can range in size but preferably is not greater than about 100 mesh, i.e. no greater than about 150 microns. A larger particle size may allow the silicon to coalesce to prevent infiltration into the body. Preferably, the hexagonal boron nitride (BN) powder has a particle size of about 325 mesh, i.e. no greater than about 45 microns.

In one embodiment, at least about 5% by volume of the material to be infiltrated comprises a component that is wetted by or reacts with silicon. Silicon has an affinity for a substance with which it reacts and will migrate toward such component. Such a reactive component is required in order for the silicon to infiltrate the porous body. Representative reactive components include elemental carbon and metals such as molybdenum, titanium, chromium, tungsten, silver and aluminum. As used herein, the term "elemental carbon" includes all forms of elemental non-diamond carbon including graphite.

The component that is wetted by or reacts with silicon can be present in an amount ranging from about 5% by volume to about 100% by volume of the material to be infiltrated. The particular amount of such component depends on the particular composite desired. Typically, the component that is wetted by or reacts with silicon is present in an amount of at least about 10% by volume, or at least about 20% by volume, or at least about 50% by volume, of the material to be infiltrated.

The portion of the material that is not reactive with silicon, can comprise a ceramic material such as silicon carbide, silicon nitride, boron nitride (BN) and aluminum nitride. Diamond may be present as a nonreactive component depending on its particle size. A fine particle size can react with silicon to form silicon carbide.

The material to be infiltrated can be in a wide variety of forms. For example, it can be in the form of a particle, filament, cloth and mixture thereof. The term filament herein includes fiber and whisker.

The material to be infiltrated can be formed into a porous body by a number of techniques. Preferably, the porous body is of the size and shape desired of the composite. For example, the body can be extruded, injection molded, die pressed, isostatically pressed or slip cast to produce a body of desired size and shape. Lubricants, binders, or similar materials used in shaping can be used with the body. Such materials should be of the type that evaporate on heating at temperatures below infiltration temperatures, preferably below 500° C., without leaving deleterious residue. Alternately, the material to be infiltrated can be packed into the cavity of a mold of the powder mixture to form a packed or constrained material.

The porous body or packed material has an open porosity ranging from greater than about 10% by volume to about 90% by volume of the body. The particular porosity depends on the composite desired. Specifically, the porosity can range from about 15% by volume to about 80% by volume, or from about 30% by volume to about 60% by volume. Open porosity of the body means pores or voids which are open to the surface of the body to make interior surfaces accessible to ambient atmosphere. Open porosity can be determined by standard metallographic techniques. Preferably, the packed material or porous body to be infiltrated does not have any closed porosity or does not have any significant amount of closed porosity. The pores in the porous body or packed material should be distributed uniformly or at least significantly uniformly to prevent formation of large pockets of silicon. Large pockets of silicon can lower mechanical properties of the infiltrated body or composite. The pores can range in size up to about 2000 microns. For best results, the pores are submicron in size.

The mixture of hexagonal boron nitride (BN) and silicon powder can be used in a variety of forms and the mixture can be placed in contact with the material to be infiltrated by a number of techniques. For example as described above, the powder mixture can be in the form of a pressed powder or in the form of a mold with a cavity of the size and shape desired of the final infiltrated body or composite. Before infiltration, when in contact with the porous body or compacted material, the mixture preferably has a porosity of less than about 50% by volume, more preferably less than about 40% by volume, and most preferably less than about 30% by volume of the powder mixture.

Hence in one embodiment, the present method for infiltrating a porous body of a material with silicon to form a composite comprises providing a material wherein at least about 5% by volume of the material comprises a component that is wetted by or reacts with silicon. The material has a melting point higher than that of silicon. A porous body is formed from the material having an open porosity ranging from greater than about 10% by volume to about 90% by volume. The body is contacted with a powder mixture comprising silicon and hexagonal boron nitride wherein the hexagonal boron nitride ranges in amount from at least some to less than about 10 wt % of the mixture. The contacted body is then heated in a nonoxidizing partial vacuum to a temperature at which silicon is fluid but below the melting point of the material of the body. The fluid silicon is then infiltrated into the body at a partial vacuum at least sufficient to remove blocking gas from the porous body to form a composite.

In another embodiment, the powder mixture is shaped into a mold having a cavity of a size and shape of a desired composite product. A material is provided wherein at least about 5% by volume of the material comprises a component which is wetted by or reacts with silicon. The material is in the form of particles, filaments, cloth or mixtures thereof and has a melting point higher than that of silicon. The material is packed into the cavity to produce a packed material or porous body therein having an open porosity ranging from greater than about 10% by volume to about 90% by volume. The body is then heated in a nonoxidizing partial vacuum to a temperature at which the silicon is fluid but below the melting point of the material as with the previous embodiment to form the composite.

In carrying out the method, a mixture of hexagonal boron nitride (BN) and elemental silicon powder is formed and contacted with the surface of the porous body or with the surface of the packed material. Since molten silicon does not wet hexagonal boron nitride (BN) powder at the temperatures used in the method, the silicon does not coalesce but moves easily by vapor and liquid flow to the surfaces of the porous body or constrained material where it reacts and/or wets the material surfaces. The boron nitride (BN) permits the silicon to infiltrate the body or material uniformly without forming surface droplets.

In another embodiment, a supporting means, preferably graphite or other elemental carbon, is used to support the porous body and the porous body is coated by the powder mixture. The resulting assembly is then heated to infiltration temperature. The support can be precoated with a parting agent such as hexagonal boron nitride (BN) to prevent sticking.

In carrying out another embodiment of the invention, the porous body is immersed in or enveloped by the powder mixture leaving none of its surface exposed. In another embodiment, the porous body is packed in a mold of the powder mixture and the complete assembly is placed in a vacuum furnace, evacuated to about 0.1 torr and heated. When cooled and restored to atmospheric pressure, the assembly can be removed from the furnace, disassembled and the silicon infiltrated part removed from the powder mixture.

The furnace used in the process can be a carbon furnace fabricated from elemental carbon. The infiltration method cannot be carried out in the presence of oxygen because the liquid silicon oxidizes to form solid silica. A carbon furnace acts as a scavenger by reacting with oxygen to produce carbon monoxide (CO) or carbon dioxide ($CO_2$) to provide a nonoxidizing atmosphere. Additionally, an oxygen scavenger such as elemental carbon, can be added to the furnace to insure a nonoxidizing atmosphere.

The following examples are illustrative of the invention.

EXAMPLE 1

Si—BN pellets were prepared by dry blending of −325 mesh silicon (Si) powder and −325 mesh boron nitride (BN) powder in weight ratios of 50 Si/50 BN, 60 Si/40 BN, 70 Si/30 BN, 80 Si/20 BN, 90 Si/10 BN and 95 Si/5 BN. The mixed powders were dry-pressed in a ¼"-steel die at 10,000 Psi pressure to form pellets. The pellets were placed on pieces of carbon felt (type WDF carbon felt, National Electric Carbon Co.) and heated to 1430° C. in a vacuum furnace. After cooling, the masses of the carbon felt pieces were measured. The percentage of silicon present in the original pellet that actually infiltrated into the carbon felt was then calculated. The results are presented in TABLE 1 below. At 50, 40 and 30% boron nitride (BN), practically no Si wicked into the carbon felt, i.e. there was no infiltration of the felt. At 20% and 10% boron nitride (BN), only about 20% of the available silicon (Si) infiltrated the felt. At 5% boron nitride (BN), nearly 70% of available Si from the pellet, infiltrated into the carbon felt. The remnant of the pellet of the silicon-boron nitride (Si—BN) mixture was friable.

TABLE 1

| Si/BN ratio | 50/50 | 60/40 | 70/30 | 80/20 | 90/10 | 95/5 |
|---|---|---|---|---|---|---|
| % of Si infiltrated | 0.6 | 0.7 | 0.9 | 18.8 | 20.3 | 69.6 |

This example establishes that less than wt % B powder mixtures provide improved results for infiltrating a ceramic.

EXAMPLE 2

A slurry was prepared by mixing 94 g silicon (Si) powder (−100 mesh), 6 g boron nitride (BN) powder (−325 mesh) with 60 g water. To this, were added 0.84 g of Rohm & Haas Duramax D-3019 dispersant and 1.6 g of Rohm & Haas Duramax B-1035 acrylic emulsion binder. The ingredients were mixed using a magnetic stirrer until uniform. Porous composite preform bars were then dipped into the slurry to coat the bars with the silicon-boron nitride (Si—BN) mixture and allowed to dry. Dipping was repeated until levels of silicon-boron nitride (Si—BN) mixture were obtained to provide mass ratios of silicon-boron nitride (Si—BN) mixture to porous preform of from 0.8 to 1.4. The coated preforms were then heated slowly (5° C./min.) to 1430° C. where they were held for 20 minutes and then cooled (5° C./min.) to room temperature. Remnant material on the bar surfaces was easily removed by scraping to leave a surface finish similar to that of the original porous preforms. Density and open porosity values of the infiltrated bars are given in the TABLE 2 below.

TABLE 2

| Si—Bn:Preform Mass Ratio | Infiltrated Density (g/cc) | Open Porosity (%) |
|---|---|---|
| 0.8 | 2.63 | 6.79 |
| 1.0 | 2.71 | 1.75 |
| 1.2 | 2.71 | 1.00 |
| 1.4 | 2.76 | 1.50 |

The data show that at infiltrant mix to preform mass ratios from 1 to 1.4, a dense, low porosity body was obtained. Only when the mass ratio fell below 1 did the density of the infiltrated body drop off and open porosity increase. The results demonstrate that precise control of the amount of infiltrant mix used is not necessary to get a dense infiltrated body with clean surfaces.

When infiltration is conducted with Si alone, the mass ratio of Si/preform must be controlled exactly since too low a ratio results in a high porosity body and too high a ratio results in a body with excess surface Si that requires machining. This Example shows that the process of the invention works with a wide range of mass ratios to provide high density parts with clean surfaces. Hence, the infiltration process of the invention is more tolerant to minor errors in mass ratio than if silicon (Si) were used alone. The silicon-boron nitride (Si—BN) mixtures permit the use of a high mass ratio of Si/perform to assure high density. Remnant surface deposit is substantially boron nitride (BN), which is friable and easily removed.

EXAMPLE 3

A slurry was prepared by mixing 91 g Si powder (−325 mesh), 6 g BN powder (−325 mesh), 3 g boron powder (<1 micron) with 70 g water and 1 g of Rohm & Haas Duramax D-3019 dispersant. The ingredients were mixed using a magnetic stirrer until uniform. Porous composite preform bars were dipped into the slurry to coat the bars with the Si—BN mixture and allowed to dry. Dipping was repeated until the desired level of Si—BN mixture was obtained. The ratio of the mass of the Si—BN mixture to the mass of the porous preform was adjusted to 1.0 and 1.5. The coated bars were then heated as above to allow for silicon melt infiltration. Again, all remnant material on the bar surfaces was easily scraped off following infiltration and the bars were well infiltrated (both bars had densities above 2.7 g/cc and open porosity values below 3%). These results demonstrate that the technique works with different starting powder sizes and when B is added to form a Si—B alloy for infiltration.

What is claimed:

1. A method for infiltrating a body with silicon, comprising:
    forming a mixture comprising silicon powder and at least some and up to about 6 wt % hexagonal boron nitride powder;
    contacting the body with said mixture, said body comprising a component that is wetted by or reacts with silicon; and
    infiltrating said contacted body with silicon from said mixture.

2. The method of claim 1, wherein contacting said body comprises dip coating or spray coating slurry of said mixture onto said body.

3. The method of claim 1, wherein contacting said body comprises embedding said body in a powder mixture of said silicon and boron nitride.

4. The method of claim 3, further comprising scraping a friable boron nitride (BN) surface coating from said body after infiltrating.

5. The method of claim 1, wherein said body comprises at least about 5% by volume of said component, which is wetted by or reacts with silicon.

6. The method of claim 1, wherein said component that is wetted by or reacts with silicon selected from the group consisting of elemental carbon, metal and mixtures thereof.

7. The method according to claim 6, wherein said metal is selected from the group consisting of molybdenum, titanium, chromium, tungsten, silver and aluminum.

8. The method of claim 1, wherein said body has an open porosity ranging from greater than about 10% by volume to about 90% by volume of said body.

9. The method of claim 1, comprising infiltrating said contacted body with silicon from said mixture by heating in a nonoxidizing partial vacuum to an infiltration temperature at which said silicon is fluid but below the melting point of said body.

10. The method of claim 9, wherein said partial vacuum is at least sufficient to remove gas from said body, which would block said infiltrating fluid silicon.

11. The method according to claim 9, wherein said body is contacted with said mixture in a supporting means.

12. The method according to claim 9, wherein said body is enveloped by said mixture in the cavity of a graphite piece.

13. The method of claim 1, comprising infiltrating said contacted body with silicon from said mixture to leave a porous deposit of boron nitride on said body.

14. The method according to claim 1, wherein said silicon has a particle size no greater than about 150 microns and said hexagonal boron nitride has a particle size no greater than 150 microns.

15. The method according to claim 1 wherein said body has an open porosity ranging from about 15% by volume to about 80% by volume of said body.

16. The method according to claim 1, wherein at least about 10% by volume of said body comprises a component that is wetted by or reacts with silicon.

17. The method according to claim 16, wherein the remainder of said body comprises a ceramic material selected from the group comprising silicon carbide, silicon nitride, boron nitride and aluminum nitride.

18. The method of claim 1, wherein said body comprises a silicon/silicon carbide (Si/SiC) composite.

19. The method of claim 1, wherein said mixture comprises silicon and hexagonal boron nitride in a weight ratio of about 95/5 silicon/hexagonal boron nitride.

20. A method for infiltrating a body with silicon, comprising:
    coating a body comprising a component that is wetted by or reacts with silicon with a slurry of at least some and up to about 5 wt % hexagonal boron nitride powder and silicon powder; and
    infiltrating said contacted body with silicon from slurry.

21. The method of claim 20, wherein said body is coated by dip coating or spray coating.

22. A method for infiltrating a body with silicon, comprising:
    forming a slurry comprising silicon powder and at least some and up to about 6 wt % hexagonal boron nitride powder dispersed in a liquid;
    contacting a body comprising a component that is wetted by or reacts with silicon with said slurry; and
    infiltrating said contacting body with silicon from said slurry.

23. The method of claim 22, wherein said slurry comprises water and a dispersant.

24. The method of claim 22, wherein the contacting step further comprises dipping a porous body into said slurry to coat said body with a Si—BN mixture and drying said body.

25. A method for infiltrating a body with silicon, comprising:
    forming a mixture comprising hexagonal boron nitride powder and greater than about 94% by weight silicon powder;
    contacting a body with said mixture, said body comprising a component that is wetted by or reacts with silicon; and
    infiltrating said contacted body with silicon from said mixture.

* * * * *